United States Patent
Terahata

(10) Patent No.: US 10,496,158 B2
(45) Date of Patent: Dec. 3, 2019

(54) IMAGE GENERATION DEVICE, IMAGE GENERATION METHOD AND NON-TRANSITORY RECORDING MEDIUM STORING IMAGE GENERATION PROGRAM

(71) Applicant: COLOPL, INC., Tokyo (JP)

(72) Inventor: Shuhei Terahata, Tokyo (JP)

(73) Assignee: COLOPL, INC., Tokyo (JP)

(*) Notice: Subject to any disclaimer, the term of this patent is extended or adjusted under 35 U.S.C. 154(b) by 156 days.

(21) Appl. No.: 15/286,485

(22) Filed: Oct. 5, 2016

(65) Prior Publication Data

US 2017/0108922 A1 Apr. 20, 2017

(30) Foreign Application Priority Data

Oct. 19, 2015 (JP) .................. 2015-205476

(51) Int. Cl.
| | | |
|---|---|---|
| G06F 3/01 | (2006.01) | |
| G02B 27/00 | (2006.01) | |
| G06F 3/00 | (2006.01) | |
| G06T 11/60 | (2006.01) | |
| H04N 5/232 | (2006.01) | |
| G06T 15/20 | (2011.01) | |

(Continued)

(52) U.S. Cl.
CPC .......... *G06F 3/013* (2013.01); *G02B 27/0093* (2013.01); *G02B 27/017* (2013.01); *G06F 3/005* (2013.01); *G06F 3/011* (2013.01); *G06T 11/60* (2013.01); *G06T 15/20* (2013.01); *G06T 19/00* (2013.01); *H04N 5/23219* (2013.01); *G02B 2027/0187* (2013.01); *G06T 2219/024* (2013.01)

(58) Field of Classification Search
CPC ........ G06F 3/1454; G06F 3/012; G06F 3/013; G06T 13/40; A63F 13/537; A63F 13/26
USPC ........................................... 348/42
See application file for complete search history.

(56) References Cited

U.S. PATENT DOCUMENTS 9,814,967 B1* 11/2017 Bone ................. A63F 13/12
9,836,268 B2* 12/2017 Shiraishi ............ G06F 3/1454
(Continued)

FOREIGN PATENT DOCUMENTS

| JP | 2002-149581 A | 5/2002 |
|---|---|---|
| JP | 2003-256872 A | 9/2003 |

(Continued)

OTHER PUBLICATIONS

Written Opinion in PCT/JP2016/080667, dated Nov. 8, 2016. 13pp.

*Primary Examiner* — Tung T Vo
(74) *Attorney, Agent, or Firm* — Hauptman Ham, LLP

(57) ABSTRACT

A communication load is reduced in a virtual-reality-space sharing system. An image generation device for generating a virtual reality space image includes a memory for storing an instruction and a processor coupled to the memory for executing the instruction. The instruction, when executed by the processor, causes the processor to acquire, from a second terminal sharing a virtual reality space with a first terminal used by a first user, line-of-sight information including a position and a line-of-sight direction of a second user using the second terminal in the virtual reality space, generate a virtual reality space image to be displayed on the first terminal based on the line-of-sight information acquired from the second terminal, and supply the generated virtual reality space image to the first terminal.

20 Claims, 10 Drawing Sheets

(51) Int. Cl.
*G06T 19/00* (2011.01)
*G02B 27/01* (2006.01)

(56) References Cited

U.S. PATENT DOCUMENTS

| | | | | |
|---|---|---|---|---|
| 2002/0075286 | A1* | 6/2002 | Yonezawa | G02B 27/017 345/679 |
| 2003/0043154 | A1* | 3/2003 | Nimura | G06T 13/40 345/474 |
| 2003/0107569 | A1* | 6/2003 | Endo | G06T 15/205 345/419 |
| 2006/0055628 | A1* | 3/2006 | Sanders-Reed | G01C 23/005 345/8 |
| 2006/0119572 | A1* | 6/2006 | Lanier | G06F 1/1601 345/156 |
| 2008/0106488 | A1* | 5/2008 | Okuno | A63F 13/06 345/8 |
| 2010/0325255 | A1 | 12/2010 | Cheung et al. | |
| 2015/0097719 | A1* | 4/2015 | Balachandreswaran | G01B 11/002 342/147 |
| 2015/0355463 | A1* | 12/2015 | Sako | G02B 27/017 345/633 |
| 2017/0150230 | A1* | 5/2017 | Shimura | H04N 21/6587 |
| 2017/0153863 | A1* | 6/2017 | Shiraishi | A63F 13/58 |
| 2017/0206691 | A1* | 7/2017 | Harrises | G06T 11/60 |

FOREIGN PATENT DOCUMENTS

| | | |
|---|---|---|
| JP | 2008-217119 A | 9/2008 |
| JP | 2008-257385 A | 10/2008 |
| WO | 2008/126701 A1 | 10/2008 |

* cited by examiner

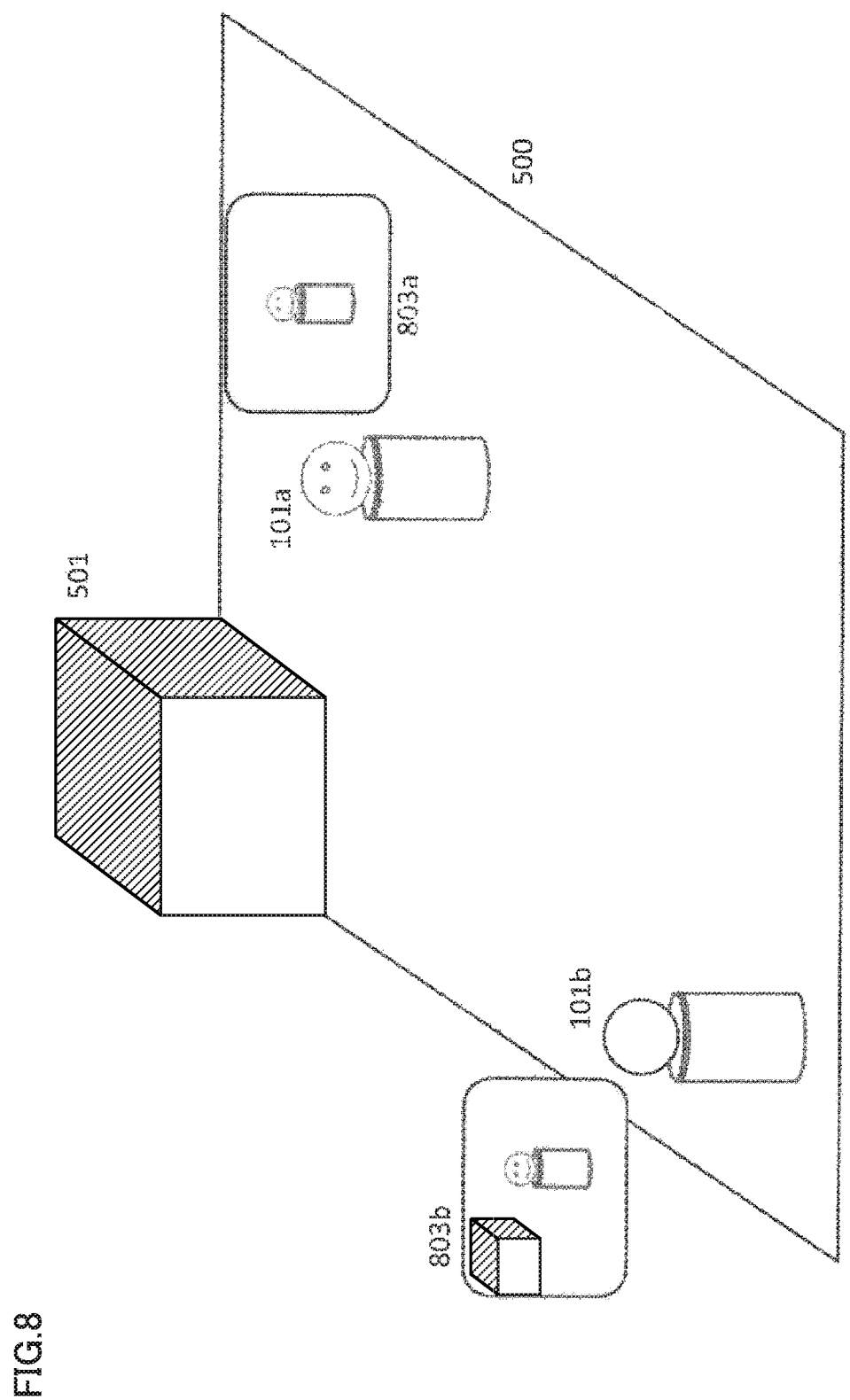

IMAGE GENERATION DEVICE, IMAGE GENERATION METHOD AND NON-TRANSITORY RECORDING MEDIUM STORING IMAGE GENERATION PROGRAM

BACKGROUND

Field

The present application claims priority to Japanese Patent Application No. 2015-205476 filed Oct. 19, 2015, the content of which is incorporated by reference herein in its entirety.

The present disclosure relates to an image generation device, an image generation method and an image generation program.

Description of the Related Art

Regarding a head-mounted display, Japanese Patent Laying-Open No. 2002-149581 (Patent Document 1) discloses a technique for "causing a plurality of users to share a virtual space displayed on a head-mounted display, and associating the position of each user in a real space with the position in the virtual space" (see [Abstract]).

SUMMARY

According to the virtual space sharing system disclosed in Patent Document 1, however, an information processing server 16 generates virtual space information (image), and transmits the virtual space information to a user control device 15 of each user over a network. This increases the communication load on the network. It is therefore required that the communication load be reduced in a virtual-reality-space sharing system.

According to one embodiment, an image generation device for generating a virtual reality space image is provided. This image generation device includes a memory for storing an instruction and a processor coupled to the memory for executing the instruction. The instruction, when executed by the processor, causes the processor to acquire, from a second terminal sharing a virtual reality space with a first terminal used by a first user, line-of-sight information including a position and a line-of-sight direction of a second user using the second terminal in the virtual reality space, generate a virtual reality space image to be displayed on the first terminal based on the line-of-sight information acquired from the second terminal, and supply the generated virtual reality space image to the first terminal.

According to another embodiment, a method executed by a computer for generating a virtual reality space image is provided. This method includes acquiring, from a second terminal sharing a virtual reality space with a first terminal used by a first user, line-of-sight information including a position and a line-of-sight direction of a second user using the second terminal in the virtual reality space, generating a virtual reality space image to be displayed on the first terminal based on the line-of-sight information acquired from the second terminal, and supplying the generated virtual reality space image to the first terminal.

According to still another embodiment, anon-transitory computer-readable recording medium storing an instruction causing a computer to execute a method for generating a virtual reality space image is provided. This method includes acquiring, from a second terminal sharing a virtual reality space with a first terminal used by a first user, line-of-sight information including a position and a line-of-sight direction of a second user using the second terminal in the virtual reality space, generating a virtual reality space image to be displayed on the first terminal based on the line-of-sight information acquired from the second terminal, and supplying the generated virtual reality space image to the first terminal.

According to an embodiment, in an aspect, a communication load can be reduced in a virtual-reality-space sharing system.

The foregoing and other objects, features, aspects and advantages of one of the embodiments will become more apparent from the following detailed description when taken in conjunction with the accompanying drawings.

BRIEF DESCRIPTION OF THE DRAWINGS

FIG. 8 is a diagram conceptually showing virtual reality space images respectively generated by image generators 231 of a first subsystem 100a and a second subsystem 100b in another aspect according to an embodiment.

DESCRIPTION OF EMBODIMENTS

Figure 1:
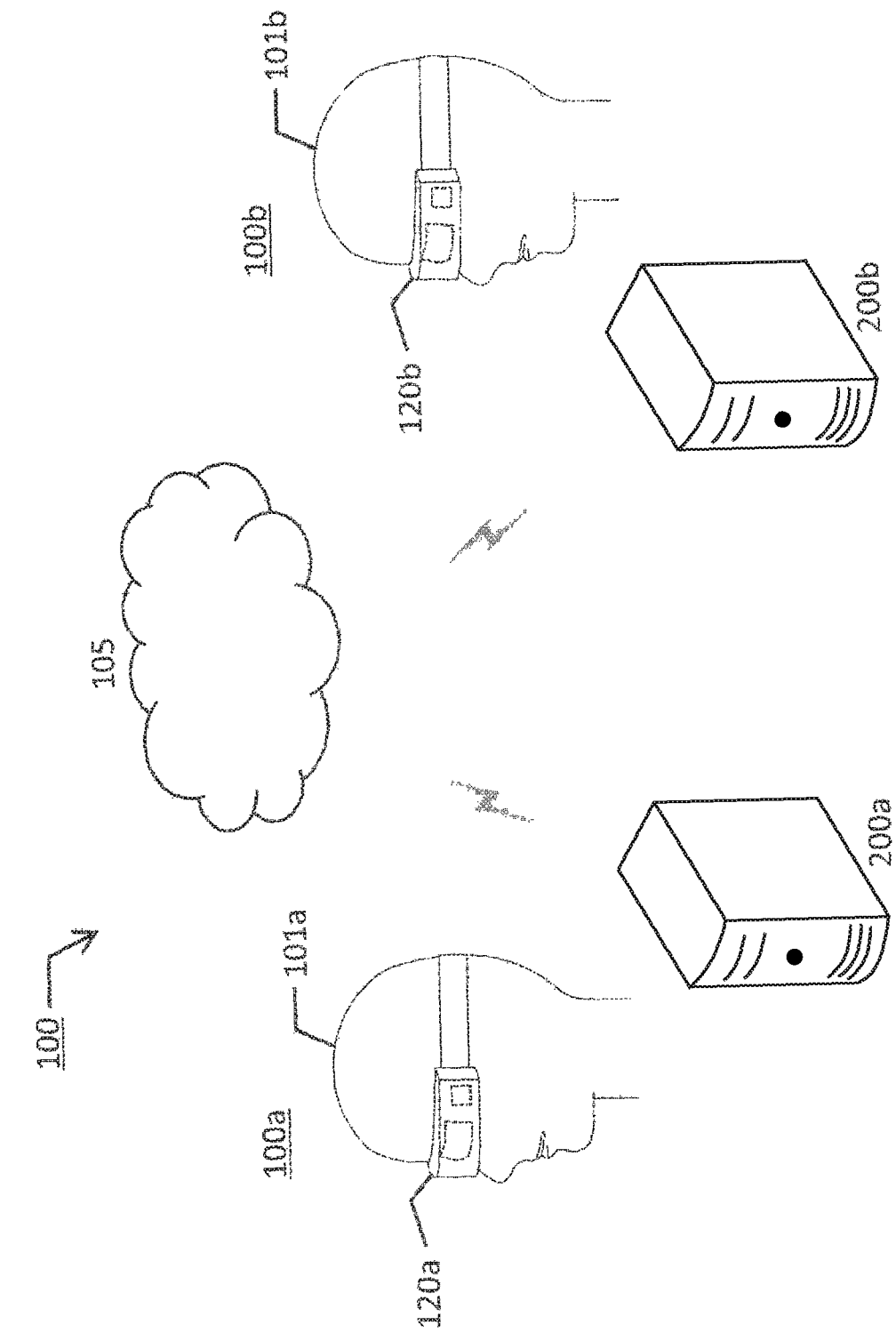
FIG. 1 is a diagram showing a schematic configuration of a virtual-reality-space sharing system 10 according to an embodiment.

Hereinafter, at least one embodiment will be described with reference to the drawings. In the following description, the same parts have the same reference characters allotted. They are named and function in the same manner. Therefore, detailed description thereof will not be repeated.

FIG. 1 is a diagram showing a schematic configuration of virtual-reality-space sharing system 10 according to an embodiment. Virtual-reality-space sharing system 10 includes first subsystem (first terminal) 100a used by a first user 101a and second subsystem (second terminal) 100b used by a second user 101b. First subsystem 100a and second subsystem 100b are connected so as to be capable of communicating with each other over a network 105. Network 105 may be any type of network, such as the Internet or LAN (Local Area Network), for example. While FIG. 1 merely shows two subsystems 100a and 100b, virtual-reality-space sharing system 10 may include any number of similar subsystems, each being used by a different user.

First subsystem 100a includes a head-mounted display (hereinafter HMD) 120a and image generation device 200a, image generation device 200a generates image data indicating a virtual reality space to be presented to first user 101a, and causes HMD 120a to display the virtual reality space image based on the generated image data. First user 101a viewing the virtual reality space image displayed on HMD 120a can experience the virtual reality space represented by the virtual reality space image. Similarly, second subsystem 100b includes an HMD 120b and image generation device 200b. Image generation device 200b generates image data indicating a virtual reality space to be presented to second user 101b, and causes HMD 120b to display the virtual reality space image based on the generated image data. Second user 101b viewing the virtual reality space image displayed on HMD 120b can experience the virtual reality space represented by the virtual reality space image.

The virtual reality space image generated by image generation device 200a of first subsystem 100a has a certain relationship with the virtual reality space experienced by second user 101b using second subsystem 100b, as will be described below. Similarly, the virtual reality space image generated by image generation device 200b of second subsystem 100b may also have a certain relationship with the virtual reality space experienced by first user 101a using first subsystem 100a. The virtual reality space is shared between first user 101a and second user 101b in such a manner.

Figure 2:
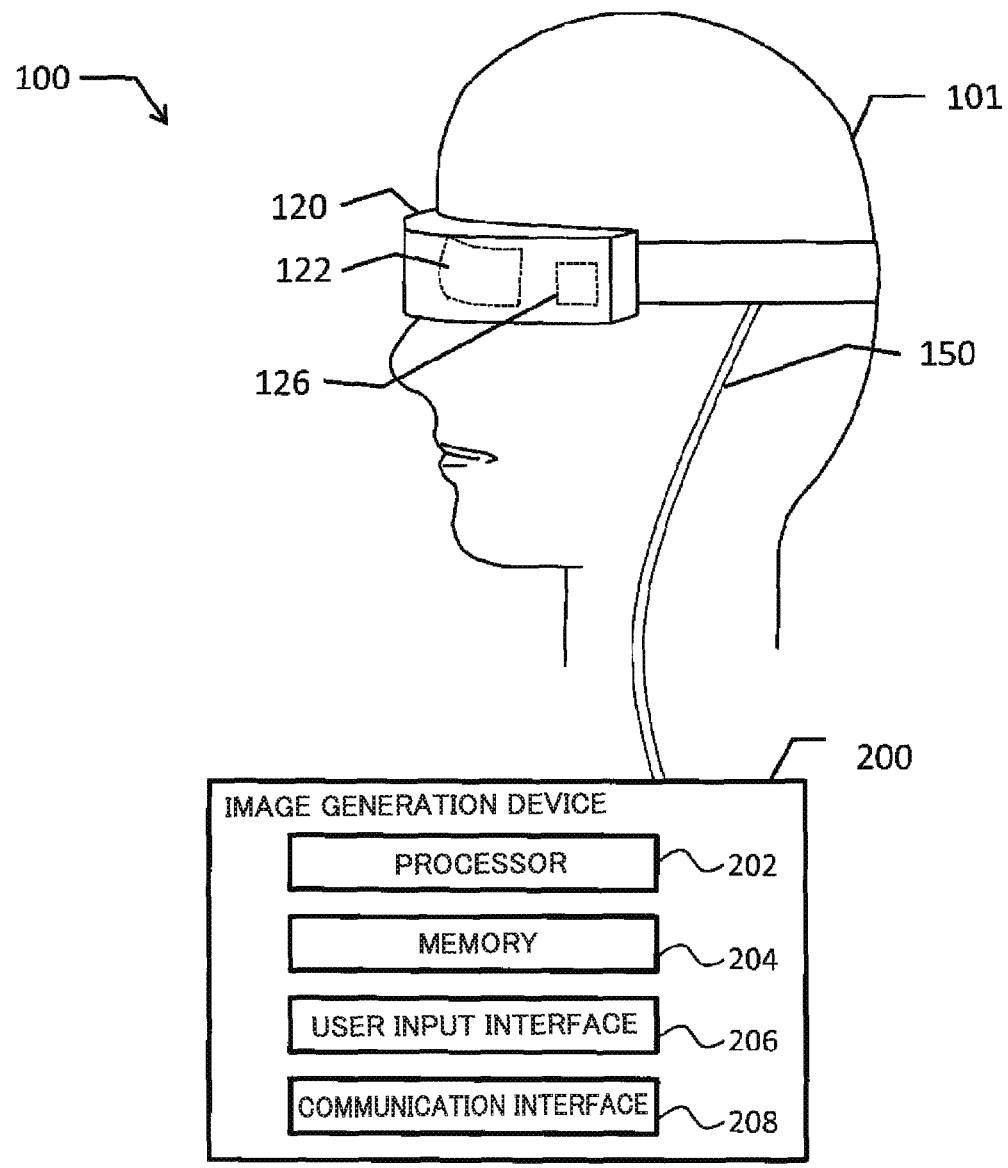
FIG. 2 is a diagram showing a hardware configuration of an image display system 100 according to an embodiment.

FIG. 2 is a diagram showing a hardware configuration of image display system 100 according to an embodiment. Image display system 100 corresponds to each of first subsystem 100a and second subsystem bob shown in FIG. 1. As described above, image display system 100 includes HMD 120 and image generation device 200. As an example, HMD 120 and image generation device 200 are electrically connected with a cable 150, and can communicate with each other. Instead of cable 150, a wireless connection may be adopted.

HMD 120 is a display device mounted on the head of a user 101 and used by user 101. HMD 120 includes a display 122 and a sensor 126. HMD 120 may further include a speaker or a headphone (not shown).

Display 122 is configured to present an image in the field of view of user 101 wearing HMD 120. For example, display 122 is implemented as a nontransparent display. In this case, the sight of the external world of HMD 120 is blocked out from the field of view of user 101, and an image projected on display 122 is delivered to the eyes of user 101. An image generated with computer graphics is displayed on display 122, for example. An example of the image generated with computer graphics is a virtual reality space image obtained by imaging a space of virtual reality (e.g., a world created by a computer game). Alternatively, based on an actual topography in the real world and position coordinate data of an object or the like, the real world may be represented by computer graphics.

Sensor 126 senses which direction the head of user 101 wearing HMD 120 faces. Sensor 126 is implemented as any of a magnetic sensor, an angular velocity sensor and an acceleration sensor, or a combination thereof, for example. When sensor 126 is a magnetic sensor, an angular velocity sensor or an acceleration sensor, sensor 126 is built in HMD 120 and outputs a value in accordance with the orientation and movement of HMD 120 (magnetic value, angular velocity value or acceleration value). Image generation device 200 processes the output value from sensor 126 by an appropriate method to calculate the orientation of the head of user 101 wearing HMD 120. The head orientation of user 101 is utilized by image generation device 200 for changing an image displayed on display 122 so as to follow the movement when user 101 moves his/her head. For example, when user 101 turns his/her head rightward (or leftward, upward or downward), a virtual sight present rightward (or leftward, upward or downward) with respect to the user in the virtual reality space may be projected on display 122.

A sensor provided outside HMD 120 may be applied as sensor 126. For example, sensor 126 may be an infrared sensor placed at a Fixed position in a room separately from HMD 120. Image generation device 200 can sense an infrared reflective marker provided on the surface of HMD 120 using this infrared sensor to specify the head orientation of user 101 wearing HMD 120.

Image generation device 200 is a device for generating an image to be displayed on HMD 120. Image generation device 200 at least includes a processor 202, a memory 204, a user input interface 206, and a communication interface 208. For example, image generation device 200 can be implemented as a personal computer, a game console, a smartphone, a tablet terminal, or the like.

Memory 204 at feast stores an operating system and an image generation program. The operating system is a computer program for controlling the overall operation of image generation device 200. The image generation program is a computer program for image generation device 200 to achieve each function in an image generation process which will be described later. Memory 204 can also store data generated by the operation of image generation device 200 temporarily or permanently. Specific examples of memory 204 include ROM (Read Only Memory), RAM (Random Access Memory), a hard disk, a flash memory, an optical disc, and the like.

Processor 202 is configured to read a program stored in memory 204 and to execute a process in accordance with the program. When processor 202 executes the image generation program stored in memory 204, each function in the image generation process which will be described later is achieved. Processor 202 includes CPU (Central Processing Unit) and GPU (Graphics Processing Unit).

User input interface 206 is configured to receive an input for operating image generation device 200 front a user of image display system 100. Specific examples of user input interface 206 include a game controller, a touchpad, a mouse, a keyboard, and the like.

Communication interface 208 is a network interface for communication with another device over a network. Image veneration device 200a of first subsystem 100a and image generation device 200b of second subsystem 100b shown in FIG. 1, for example communicate with each other over network 105 using each communication interface 208.

The detailed functions of image generation device 200 according to an embodiment will now be described. Image generation device 200 can be classified into three types depending on the details of an image to be generated. Hereinafter, they will be described as first, second and third aspects, respectively.

Figure 3A:
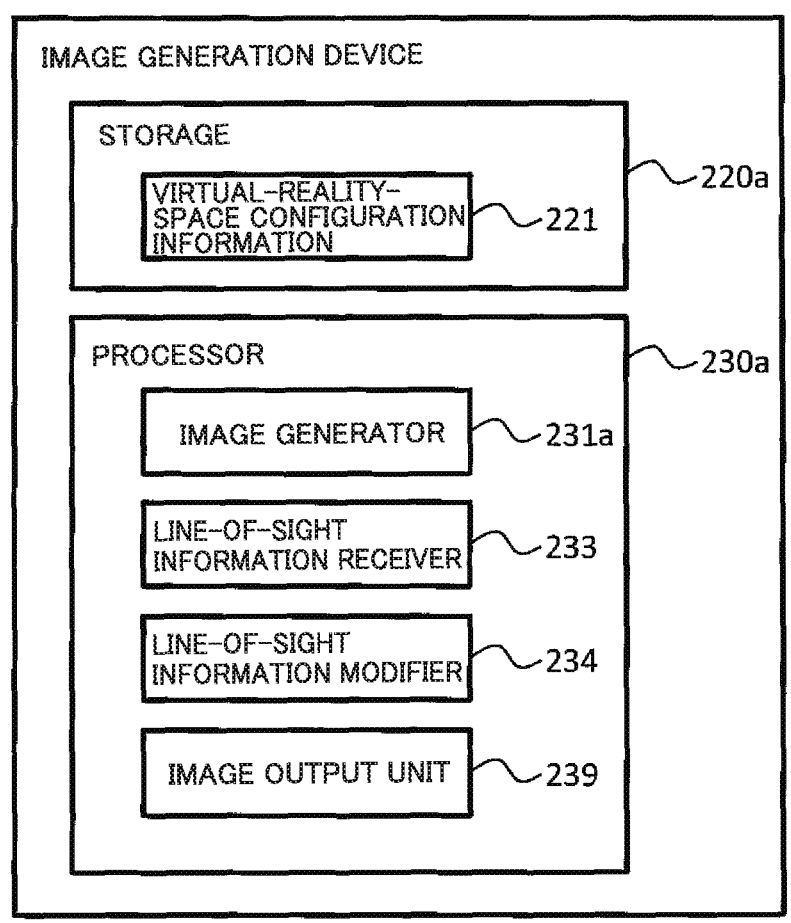
FIG. 3A is a block diagram showing a functional configuration of an image generation device 200a according to an embodiment.
Figure 3B:
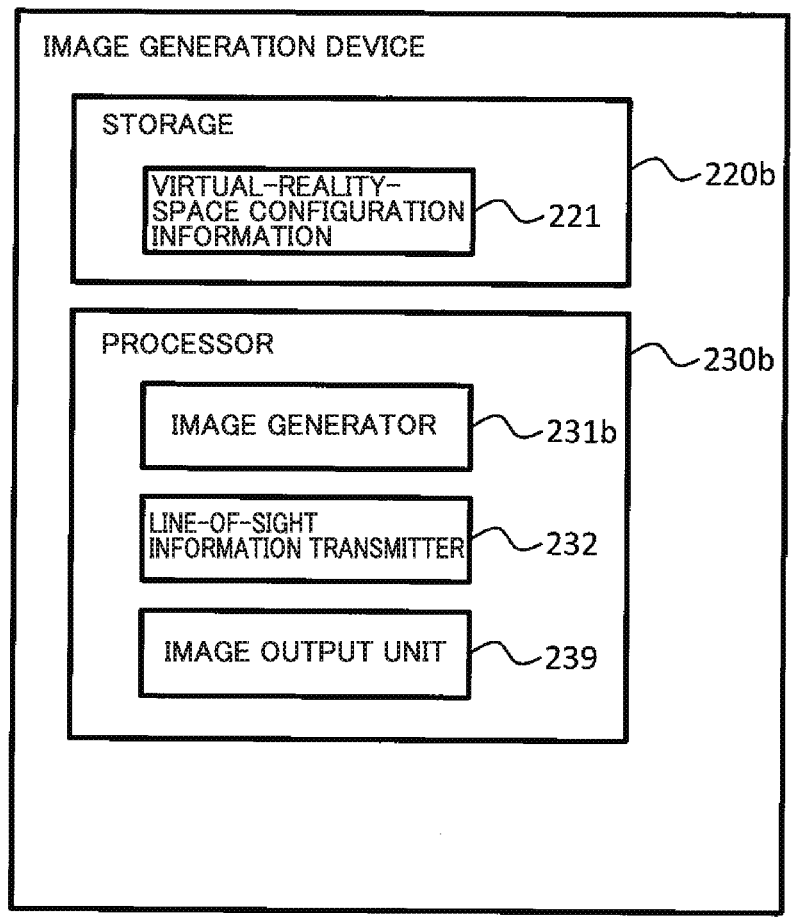
FIG. 3B is a block diagram showing a functional configuration of an image generation device 200b according to an embodiment.

FIG. 3A is a block diagram showing a functional configuration of image generation device 200a according to a first aspect of an embodiment. FIG. 3B is a block diagram showing a functional configuration of image generation device 200b according to the first aspect of an embodiment. As described above (see FIG. 1), image generation device 200a is an element constituting first subsystem 100a, and image generation device 200b is an element constituting second subsystem 100b. Image generation devices 200a and 200b may have an identical hardware configuration as described with reference to FIG. 2, but they have different functional configurations as will be described below.

First, referring to FIG. 3B, image generation device 200*b* of second subsystem 100*b* will be described. Image generation device 200*b* has a storage 220*b* and a processor 230*b*. Furthermore, processor 230*b* includes an image generator 231*b*, a line-of-sight information transmitter 232 and an image output unit 239. Storage 220*b* corresponds to memory 204 shown in FIG. 2. Processor 230*b* and respective units 231*b*, 232 and 239 included in processor 230*b* represent the functions in the image generation process implemented by processor 202 shown in FIG. 2 reading and executing the image generation program in memory 204.

Image generator 231*b* generates an image to be displayed on HMD 120*b*. For example, image generator 231*b* acquires predetermined data from storage 220*b*, and generates an image by computer graphics processing based on the acquired data. As an example, image generator 231*b* generates a virtual reality space image by which second user 101*b* wearing HMD 120*b* can recognize a virtual reality space created by a computer game. The virtual reality space image represents a sight that a user can view in the virtual reality space. For example the virtual reality space image generated by image generator 231*b* includes various objects, such as a character appearing in a computer game, a landscape with buildings, trees and the like, furniture in a room and the interior such as walls, an item on the ground, a part of the body (hand or leg) of an avatar (user) operated by a user, and an object (gun or sword) held by the avatar in its hand. Storage 220*b* stores, as virtual-reality-space configuration information 221, data for generating a virtual reality space image, such as the arrangement position, shape, color, and the like of each of such objects constituting the virtual reality space. Image generator 231*b* generates such a virtual reality space image for a computer game based on virtual-reality-space configuration information 221 acquired from storage 220*b*.

Image generator 231*b* may change an image based on an output value from sensor 126. For example, an image generated by image generator 231*b* may be an image representing how the field of view of a user in a virtual reality space transitions following the movement of the head of second user 101*b* indicated by the output value from sensor 126.

Figure 4:
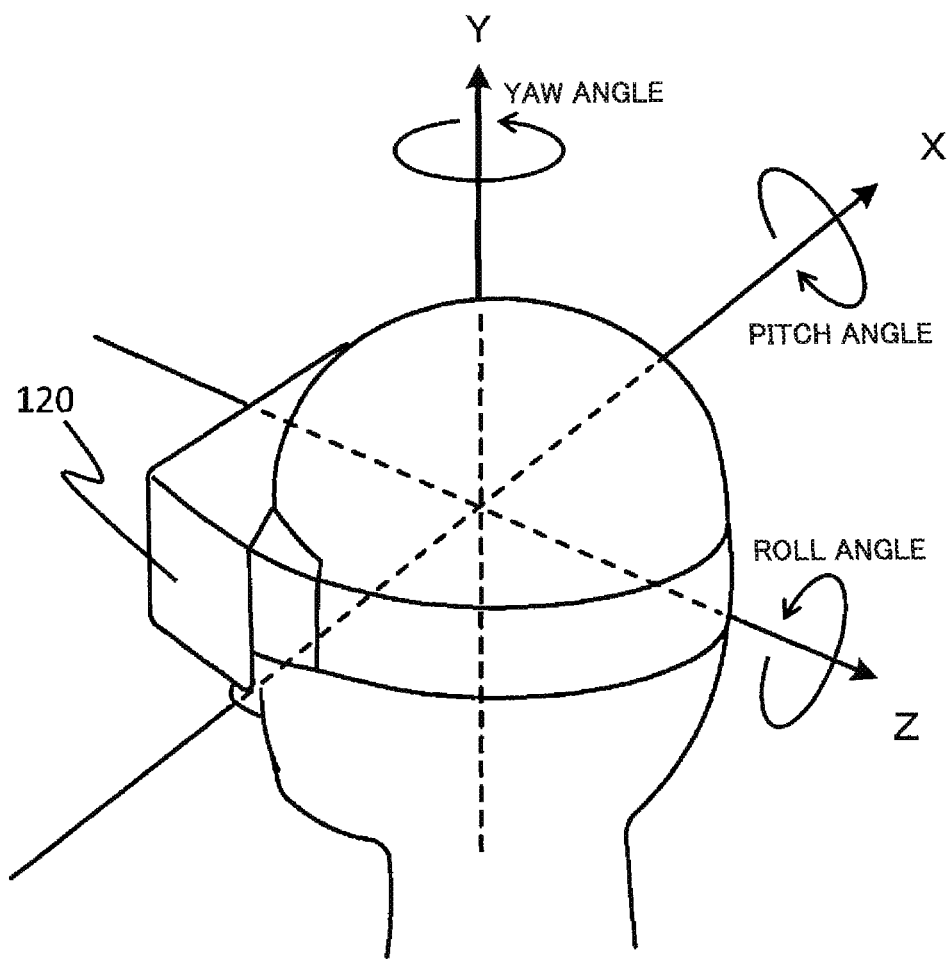
FIG. 4 is a diagram schematically showing a movement of the head of a user.

FIG. 4 is a diagram schematically showing a movement of the head of user 101 according to an embodiment. As shown in the drawing, an axis connecting the center of the head of user 101 and the center of HMD 120 (the center of a screen on display 122) is denoted as a Z-axis, an axis connecting the center of the head and the parietal region of user 101 is denoted as a Y-axis, and an axis passing through the center of the head of user 101 and orthogonal to the Y- and Z-axes is denoted as an X-axis. When sensor 126 is an angular velocity sensor, for example, values of angular velocities of the pitch angle about the X-axis, the yaw angle about the Y-axis, and the roll angle about the Z-axis are output from sensor 126, Image generator 231*b* changes the virtual reality space image based on the output values of these angular velocities, i.e., the head orientation of user 101. For example, when user 101 turns his/her head to the right, the yaw angle about the Y-axis changes. Image generator 231*b* changes the virtual reality space image such that a sight present on the right of the user may be projected in the virtual reality space in accordance with the change in angular-velocity value about the Y-axis. Similarly, when user 101 tilts his/her head to the right, the roll angle about the Z-axis changes. Image generator 231*b* changes the virtual reality space image such that the field of view of the user in the virtual reality space is tilted to the right in accordance with the change in angular-velocity value about the Z-axis.

Image generator 231*b* may change an image based on the position of a user. For example, when the user walks around in the virtual reality space, an image generated by image generator 231*b* may be an image representing a sight visible from the position where the user currently stands in the virtual reality space. As an example, storage 220*b* stores time-dependent location information of the user in the virtual reality space, Image generator 231*b* acquires previous location information of the user in the virtual reality space from storage 220*b*. Instructions about the direction of user's movement and moving speed are input through user input interface 206, such as a game controller, as an operational input for the user to walk around in the virtual reality space. Image generator 231*b* calculates the current position of the user in the virtual reality space based on the previous location information of the user acquired from storage 220*b* as well as the information on the direction of user's movement and moving speed input through user input interface 206. Based on the calculated user's current position, image generator 231*b* changes the virtual reality space image such that the user's field of view transitions in accordance with the user walking around in die virtual reality space.

In this manner, image generator 231*b* generates a virtual reality space image in accordance with the position of the user and the orientation of his/her head in the virtual reality space. The generated virtual reality space image is output to HMD 120*b* via image output unit 239 for display on display 122. Accordingly, second user 101*b* can view a virtual sight present in a direction to which he/she turns his/her head from the location where he/she currently stands in the virtual reality space.

Line-of-sight information transmitter 232 of image generation device 200*b* transmits line-of-sight information of second user 101*b* to image generation device 200*a* of first subsystem 100*a* over network 105. The line-of-sight information is information indicating where the user is located in the virtual reality space and in which direction he/she is viewing. As an example, the line-of-sight information includes the current position of second user 101*b* in the virtual reality space and the orientation of his/her head. For example, line-of-sight information transmitter 232 may acquire, from image generator 231*b*, the user's position in the virtual reality space and the orientation of his/her head used by image generator 231*b* for generating a virtual reality space image, and may transmit them as line-of-sight information. The orientation of the user's head in the virtual reality space at least includes the line-of-sight information of the user. The users line-of-sight information is a direction along the Z-axis shown in FIG. 4, and corresponds to the direction to the screen center of the virtual reality space image displayed on display 122 of HMD 120*b*. Furthermore, the orientation of the users head in the virtual reality space may include a rotation with respect to the user's line-of-sight information (i.e., the roll angle about the Z-axis). In this manner, the line-of-sight information of second user 101*b* transmitted from line-of-sight information transmitter 232 is utilized in image generation device 200*a* of first subsystem 100*a* for the image generation process.

Returning to FIG. 3A, image generation device 200*a* of first subsystem 100*a* will now be described. Image generation device 200*a* has a storage 220*a* and a processor 230*a*. Furthermore, processor 230*a* includes an image generator 231*a*, a line-of-sight information receiver 233, a line-of-sight information modifier 234, and image output unit 239.

Storage 220a corresponds to memory 204 shown in FIG. 2. Processor 230a and respective units 231a, 233, 234, and 239 included in processor 230a represent the functions of the image generation process according to at least one embodiment implemented by processor 202 shown in FIG. 2 reading and executing the image generation program in memory 204.

Image generator 231a generates an image to be displayed on HMD 120a. For example, image generator 231a generates a virtual reality space image by computer graphics processing using virtual-reality-space configuration information 221 stored in storage 220a. As an example, the virtual reality space image is an image causing first user 101a wearing HMD 120a to recognize a virtual reality space created by a computer game.

The image generation process by image generator 231a is performed based on line-of-sight information of second user 101b transmitted from image generation device 200b of second subsystem 100b. For example, the line-of-sight information of second user 101b is received by line-of-sight information receiver 233, and is supplied to image generator 231a for the image generation process. As an example, image generator 231a generates a virtual reality space image representing a sight taken from the viewpoint of second user 101b viewing the virtual reality space. In this case, the virtual reality space image generated by image generator 231a is the same as the virtual reality space image generated in image generation device 200b of second subsystem 100b. As described above, the line-of-sight information of second user 101b includes the current position of second user 101b in the virtual reality space and the orientation of his/her head (line-of-sight direction). Image generator 231a specifies the current position of second user 101b in the virtual reality space and the line-of-sight direction from the line-of-sight information of second user 101b. Image generator 231a further specifies a sight present in the line-of-sight direction from that position in the virtual reality space, thereby generating the same virtual reality space image as that generated by image generation device 200b of second subsystem 100b.

Figure 5:
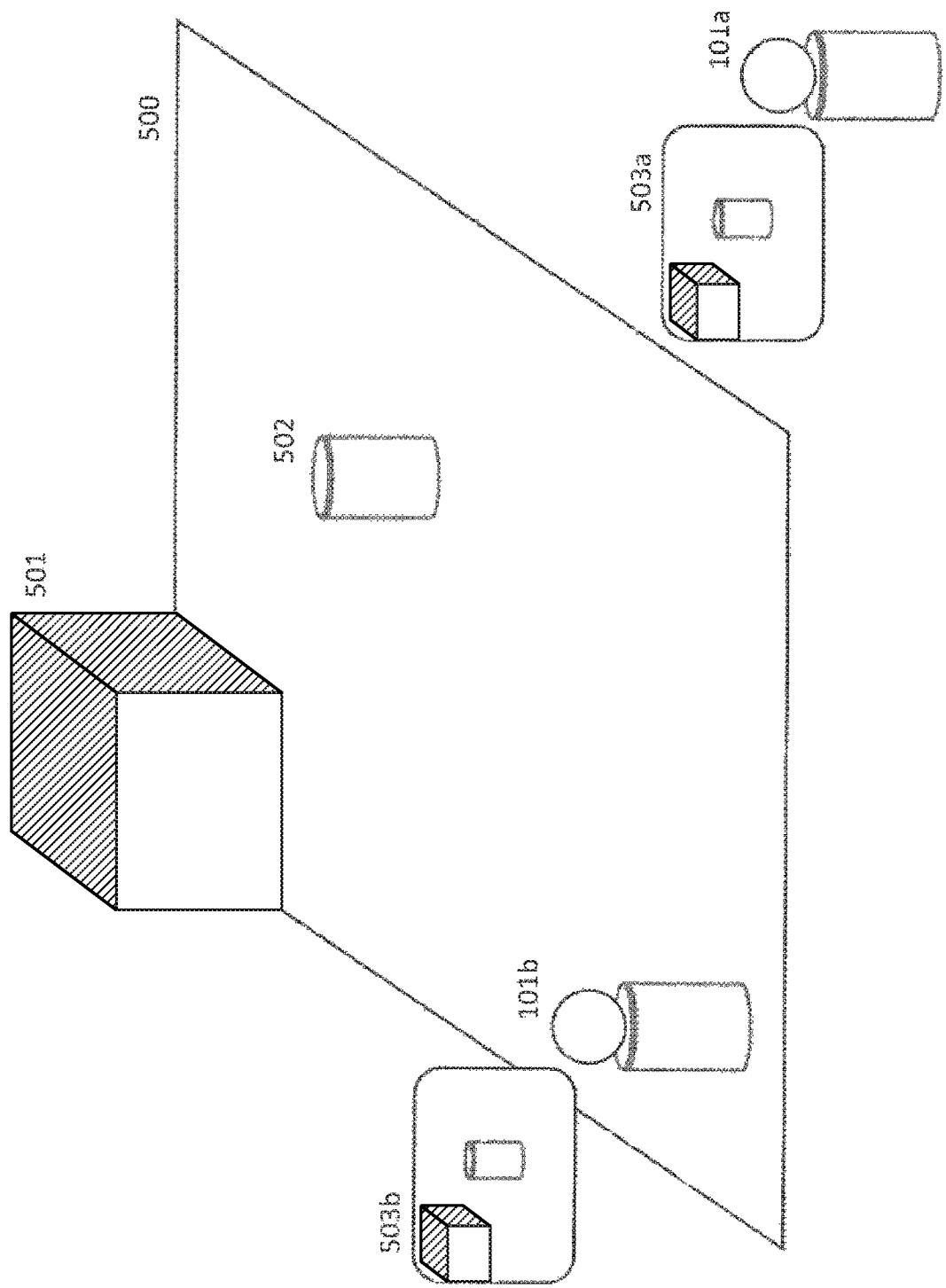
FIG. 5 is a diagram conceptually showing virtual reality space images generated by image generators 231a and 231b, respectively.

FIG. 5 is a diagram conceptually showing virtual reality space images generated by image generators 231a and 231b, respectively. In FIG. 5, second user 101b is positioned in a field 500 which is a partial region in a virtual reality space. Objects (e.g., a building, an obstacle, etc.) 501 and 502 are also located in field 500. Field 500 is, for example, a game area in a sports game (e.g., a tennis court, a baseball ground, etc.), a battle area in an interactive fighting game or action game, or the like. Second user 101b positioned in field 500 is present as a player who actually plays a computer game, and is directed toward objects 501 and 502. Image generation device 200b n age generator 231b) of second subsystem 100b used by second user 101b generates a virtual reality space image 503b including objects 501 and 502 based on the position of second user 101b in the virtual reality space and the head orientation (line-of-sight direction) of second user 101b acquired from sensor 126. On the other hand, first user 101a is positioned outside field 500. First user 101a outside field 500 is a spectator observing second user 101b playing a game, for example. Image generation device 200a (image generator 231a) of first subsystem 100a used by first user 101a generates a virtual reality space image 503a based on the line-of-sight information of second user 101b transmitted from image generation device 200b of second subsystem 100b. As shown in the drawing, virtual reality space image 503a is an image including objects 501 and 502, which is identical to virtual reality space image 503b.

In this manner, image generator 231a generates a virtual reality space image identical to that generated by image generation device 200b of second subsystem 100b, based on the line-of-sight information of second user 101b transmitted from image generation device 200b of second subsystem 100b over network 105b. The generated virtual reality space image is output to HMD 120a via image output unit 239 and displayed on display 122. Accordingly, first user 101a can view, in the virtual reality space, the same virtual sight as that second user 101b is viewing.

In the present embodiment, what is transmitted over network 105 is the line-of-sight information of second user 101b alone. Since the line-of-sight information is information on the position and direction, it includes much less data than an image itself. Therefore, the communication load on the network can be reduced.

When transmitting the line-of-sight information of second user 101b over network 105, the line-of-sight information of second user 101b may be delayed without timely arriving at image generator 231a, or a part or the whole of data may be lost, depending on the communication status of network 105 or the processing status of image display system 100 (first subsystem 100a and/or second subsystem 100b). Image generation device 200a includes line-of-sight information modifier 234 in order to cope with such a situation. However, line-of-sight information modifier 234 may operate, not only when there is a problem in receiving line-of-sight information, but also when the line-of-sight information could have been acquired properly.

Line-of-sight information modifier 234 modifies the line-of-sight information of second user 101b. For example, line-of-sight information modifier 234 modifies the line-of-sight information using line-of-sight information having been acquired. As an example, image generation device 200b of second subsystem 100b transmits line-of-sight information of second user 101b at predetermined time intervals. This time-dependent line-of-sight information is received by line-of-sight information receiver 233, and is stored in storage 220a in a time-series manner. When new line-of-sight information of second user 101b is not received from second subsystem 100b at a scheduled time, for example, line-of-sight information modifier 234 acquires previous line-of-sight information from storage 220a, and generates modified line-of-sight information based on the acquired previous line-of-sight information. The modified line-of-sight information is utilized in the image generation process in image generator 231a instead of line-of-sight information of second user 101b not having been received at the scheduled time.

As an example, line-of-sight information modifier 234 generates modified line-of-sight information in accordance with the following expressions:

$$Pe(t=n)=Fs(\alpha)Ps(t=n-1)+Fe(\alpha)Pe(t=n-1) \qquad (1)$$

$$Re(t=n)=Fs(\beta)Rs(t=n-1)+Fe(\beta)Re(t=n-1) \qquad (2)$$

The meaning of each variable in Expressions (1) and (2) is indicated below. The subscript t indicates time.

Pe(t=n): the position of the second user to be currently modified (current modified line-of-sight information)

Pe(t=n−1): the position of the second user previously modified (previous modified line-of-sight information)

Ps(t=n−1): the position of the second user previously received (previous line-of-sight information)

Re(t=n): the head oriel n of the second user to be currently modified (current modified line-of-sight information)

Re(t=n−1): the head orientation of the second user previously modified (previous modified line-of-sight information)

Rs(t=n−1): the head orientation of the second user previously received (previous line-of-sight information)

Fs(α): weighting function
Fe(α): weighting function
Fs(β): weighting function
Fe(β): weighting function Here, positions Pe and Ps of the second user are expressed by three dimensional coordinates of a virtual reality space. Orientations Re and Rs of the head of the second user indicates three axial directions of X-, Y- and Z-axes shown in FIG. 4, for example. As described above, the Z-axis in FIG. 4 corresponds to the line-of-sight information of the user.

Storage 220a accumulates line-of-sight information Ps(t) and Rs(t) of second user 101b having been received from second subsystem 100b until the previous time (i.e., t≤n−1). Storage 220a also accumulates modified line-of-sight information Pe(t) and Re(t) having been modified by line-of-sight information modifier 234 until the previous time (t≤n−1). At time t=n, line-of-sight information modifier 234 acquires, from storage 220a, immediately preceding (previous) line-of-sight information Ps(t=n−1), Rs(t=n−1) and modified line-of-sight information Pe(t=n−1) Re(t=n−1) of second user 101b, and substitutes them into Expressions (1) and (2), respectively, to generate current modified line-of-sight information Pe(t=n) and Re(t=n).

In this manner, even if the line-of-sight information of second user 101b (Ps(t=n) and Rs(t=n)) has not been received properly at time t=n from image generation device 200b of second subsystem 100b, line-of-sight information modifier 234 can modify the line-of-sight information of second user 101b. The modified line-of-sight information of second user 101b (i.e., current modified line-of-sight information Pe(t=n) and Re(t=n)) is supplied to image generator 231a for the image veneration process. Image generator 231a uses these pieces of modified line-of-sight information Pe(t=n) and Re(t=n) to generate a virtual reality space image similarly to the above-described process. The generated virtual reality space image represents a sight taken by viewing the virtual reality space in the position and line-of-sight direction (head orientation) the virtual reality space specified by modified line-of-sight information Pe(t=n) and Re(t=n). In this case, since modified line-of-sight information Pe(t=n) and Re(t=n) slightly differ from the actual position and line-of-sight direction (head orientation) of second user 101b in the virtual reality space, the virtual reality space image generated by image generator 231a is an image slightly offset from a virtual reality space image generated in image generation device 200b of second subsystem 100b. However, since the image is generated in a fixed cycle without causing frame toss, image generation device 200a can provide first user 101a using first subsystem 100a with smooth video without the movement of the video stopping instantaneously or the video jumping suddenly.

As the weighting functions in Expressions (1) and (2), the following may be applied, for example.

$Fs(\alpha)=\alpha$ $Fe(\alpha)=1-\alpha$ $Fs(\beta)=\beta$ $Fe(\beta)=1-\beta$

When such weighting functions are used, Modification Expressions (1) and (2) for line-of-sight information represent linear interpolation between previous line-of-sight information Ps(t=n−1), Rs(t=n−1) and previous modified line-of-sight information Pe(t=n−1), Re(t=n−1). Interpolation coefficients α and β may be defined as follows, for example. A symbol (A, B) refers to the inner product of vectors A and B.

$\alpha = \Delta T \times V$ $\beta = \Delta T \times V \times (1-d)$ $d = (Rs(t=n-1), Re(t=n-1))$ Here, ΔT is a time difference from time t=n−1 until image generator 231a performs image generation, and V is a parameter (interpolation speed) designating how much the line-of-sight information is to be changed per unit time. However, ΔT and V shall be adjusted such that 0≤α≤1 holds. Vectors Rs(t=n−1) and Re(t=n−1) shall be normalized, and a definition d=0 shall be made when a value d of the inner product is negative.

By using such linear interpolation when modifying line-of-sight information, "sickness" that first user 101a feels when experiencing a virtual reality space may be reduced For example, as interpolation speed V has a larger value, line-of-sight information Pe(t=n) and Re(t=n) modified in accordance with Modification Expressions (1) and (2) are closer to actual line-of-sight information Ps(t=n−1) and Rs(t=n−1) of second user 101b. Contrarily, as interpolation speed V has a smaller value, line-of-sight information Pe(t=n) and Re(t=n) modified in accordance with Modification Expressions (1) and (2) deviate from actual line-of-sight information Ps(t=n−1) and Rs(t=n−1) of second user 101b. Therefore, when interpolation speed V is set to be small, the movement of second user 101b is less likely to be reflected in modified line-of-sight information Pe(t=n) and Re(t=n). Accordingly, even if second user 101b abruptly turns his/her position or line-of-sight direction, such an abrupt change does not appear in the virtual reality space image generated by image generator 231a. As a result, first user 101a can experience a virtual reality space in which he/she is less likely to feel "sickness."

Here, interpolation coefficient includes the factor (1−d). Thus, interpolation coefficient β decreases as the angular difference between the vector of line-of-sight information Rs(t=n−1) regarding the head orientation (line-of-sight direction) of a user and vector Re(t=n−1) of modified line-of-sight information is smaller, so that modified line-of-sight information Re(t=n) closer to previous modified line-of-sight information Re(t=n−1) is acquired, Interpolation coefficient β increases as the angular difference between the two vectors is larger, so that modified line-of-sight information Re(t=n) closer to previous line-of-sight information Rs(t=n−1) is acquired. Accordingly, an abrupt movement of second user 101b is less likely to be reflected in a virtual reality space being viewed by first user 101a. First user 101a can thus experience a virtual reality space in which he/she is still less likely to feel "sickness." Interpolation coefficient of may include the factor (1−d).

Furthermore, while Modification Expression (2) is made up of expressions of three components respectively corresponding to the three axial directions of the X-, Y- and Z-axes shown in FIG. 4, interpolation coefficient β (interpolation speed V) in each expression may not necessarily be equal. For example, among the expressions of the three components, an interpolation speed VZ in the expression corresponding to the Z-axis (roll axis) may be set to be smaller than interpolation speeds VX and VY in the expressions corresponding to the X-axis (pitch axis) and the Y-axis (yaw axis), respectively, Since an abrupt image change about the roll axis is particularly likely to be a cause of a user feeling "sickness", a setting is made such that VZ<VX, VY holds to reduce a change about the roll axis of a virtual reality space image with respect to changes about the pitch and yaw axes. Therefore, "sickness" that first user 101a feels can be reduced effectively.

In a second aspect of an embodiment, the function of image generator 231a of first subsystem 100a differs from that of the first aspect. Therefore, description of the details common to the first aspect will not be repeated, Hereinafter, a difference will be described. Image generation devices 200a, 200b according to the present aspect are implemented by using a hardware configuration similar to the hardware configuration which implements image generation devices 200a and 200b according to the above-described aspect. Therefore, description of the hardware configuration will not be repeated.

Figure 6:
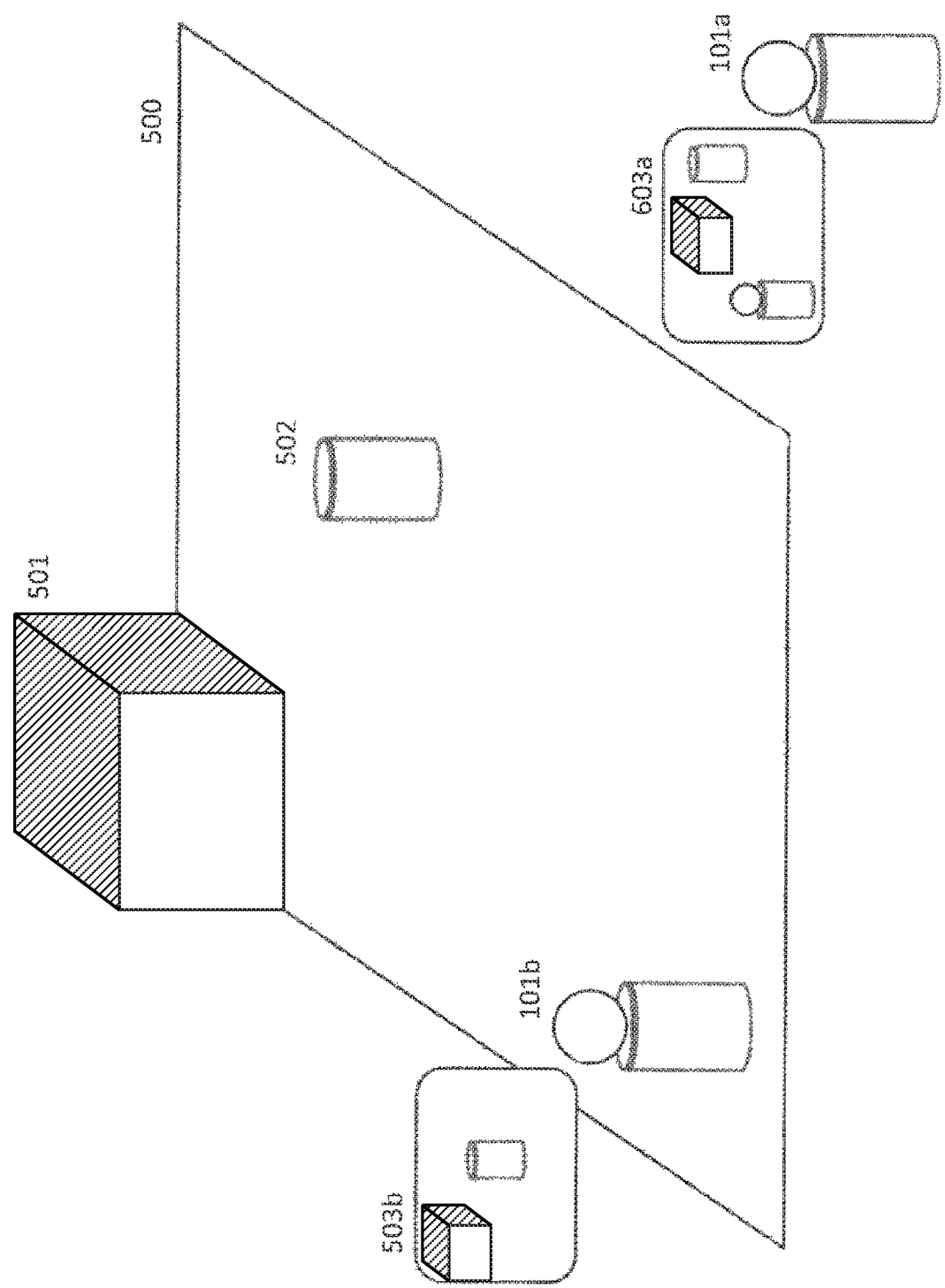
FIG. 6 is a diagram conceptually showing virtual reality space images respectively generated by image generators 231a and 231b in another aspect according to an embodiment.

FIG. 6 is a diagram conceptually showing virtual reality space images generated by image generators 231a and 231b according to the second aspect, respectively, FIG. 6 differs from FIG. 5 as to the details of a virtual reality space image 603a generated by image generator 231a. Virtual reality space image 603a is an image taken from the viewpoint of first user 101a viewing field 500 at the position of first user 101a in a virtual reality space. As shown in the drawing, virtual reality space image 603a includes object 101b (object representing second user 101b) in addition to objects 501 and 502, First user 101a may walk around in the virtual reality space, or may turn the line-of-sight direction. Similarly to image generator 231b of second subsystem 100b, image generator 231a of first subsystem 100a changes virtual reality space image 603a so as to follow such a movement of first user 101a. Furthermore, image generator 231a controls object 101b in virtual reality space image 603a based on the line-of-sight information of second user 101b transmitted from second subsystem 100b. For example, image generator 231a matches the orientation of object 101b in virtual reality space image 603a with the actual face orientation of second user 101b on field 500. Image generator 231a may locate object 101b at a position in virtual reality space image 603a that corresponds to the place where second user 101b stands on field 500.

Virtual reality space image 603a may be an image including object 101b alone. An example of object 101b in such virtual reality space image 603a is the face of an avatar representing second user 101b. In this case, the face orientation of the avatar, for example, may be controlled based on the line-of-sight information of second user 101b transmitted from second subsystem 100b, similarly to the above-described case.

Furthermore, image generation device 200a according to the second aspect includes line-of-sight information modifier 234 identical to line-of-sight information modifier 234 included in image generation device 200a according to the first aspect. Line-of-sight information modifier 234 modifies line-of-sight information of second user 101b similarly to the case of the first aspect. By using the modified line-of-sight information in the present aspect, the movement of object 101b in virtual reality space image 603a can be rendered smooth.

In a third aspect according to an embodiment, image generation device 200a of first subsystem 100a and image generation device 200b of second subsystem 100b have an identical function. Therefore, the following description will be made focusing on a difference from the above-described aspects. Image generation devices 200a and 200b according to the present aspect are implemented by using a hardware configuration similar to the hardware configuration which implements image generation devices 200a and 200b according to the above-described aspects. Therefore, description of the hardware configuration will not be repeated.

Figure 7A:
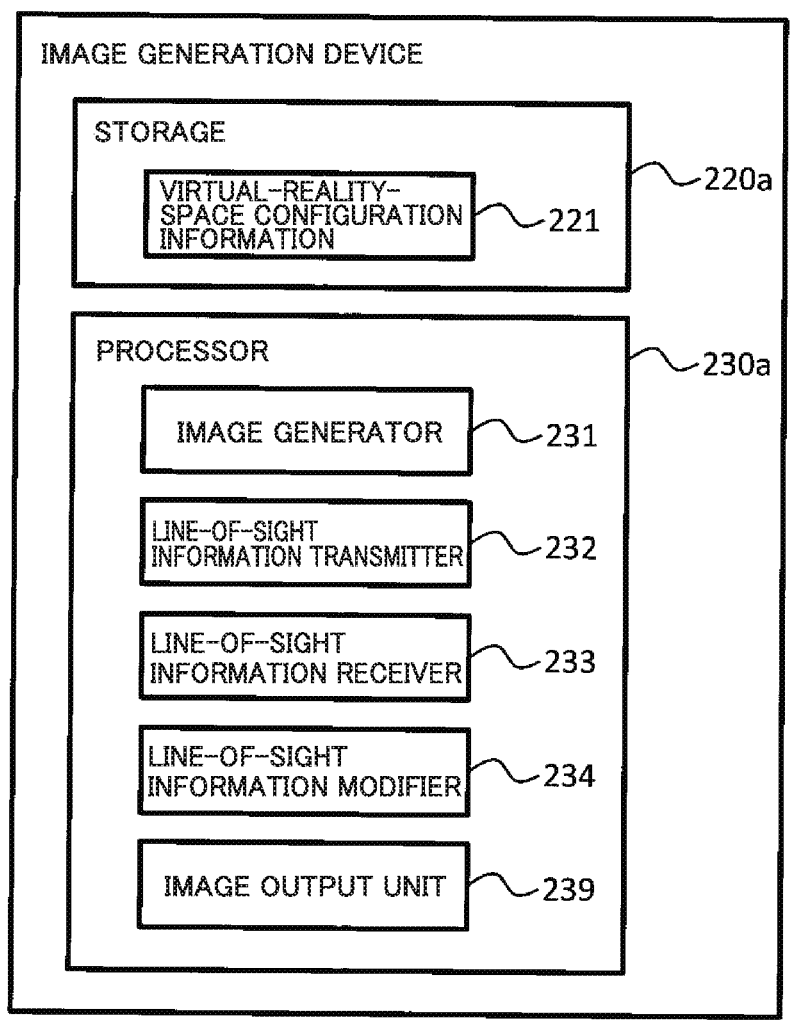
FIG. 7A is a block diagram showing a functional configuration of image generation device 200a in another aspect according to an embodiment.
Figure 7B:
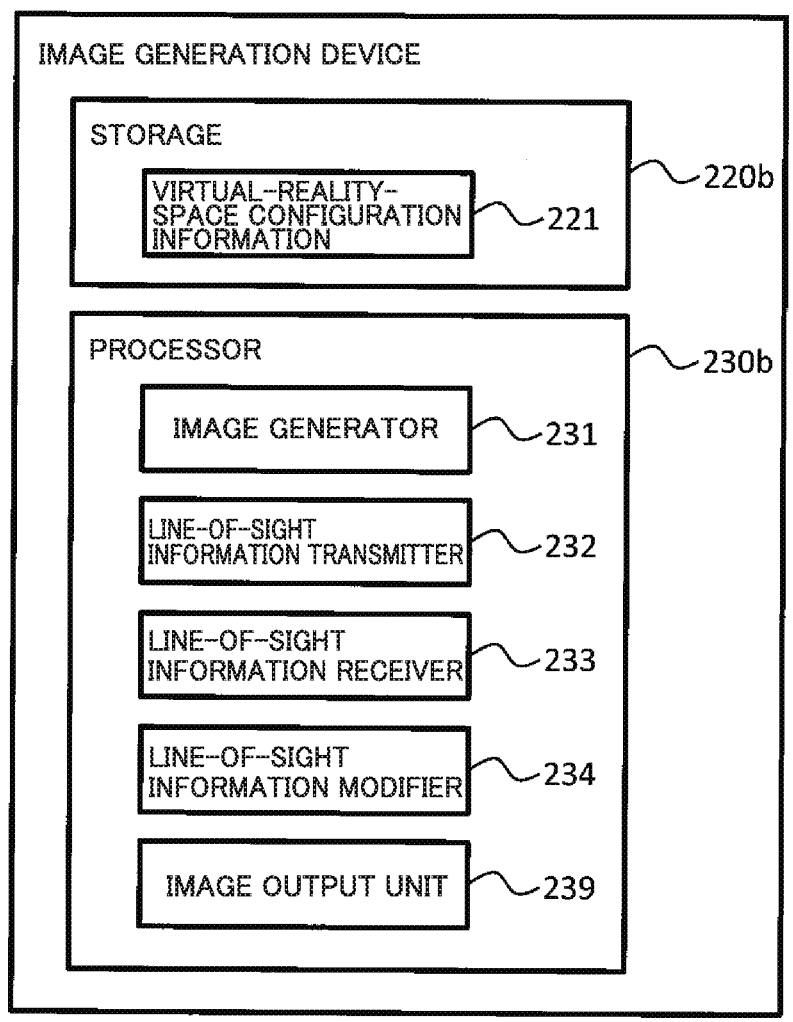
FIG. 7B is a block diagram showing a functional configuration of image generation device 200b in another aspect according to an embodiment.

FIG. 7A is a block diagram showing a functional configuration of image generation device 200a according to the third aspect. FIG. 7B is a block diagram showing a functional configuration of image generation device 200b according to the third aspect.

Referring to FIG. 7A, image generation device 200a of first subsystem 100a has storage 220a and processor 230a. Furthermore, processor 230a includes image generator 231, line-of-sight information transmitter 232, line-of-sight information receiver 233, line-of-sight information modifier 234, and image output unit 239.

Referring to FIG. 7B, similarly, image generation device 200b of second subsystem 100b has storage 220b and processor 230b. Furthermore, processor 230b includes image generator 231, line-of-sight information transmitter 232, line-of-sight information receiver 233, line-of-sight information modifier 234, and image output unit 239. Storages 220a and 220b correspond to memory 204 shown in FIG. 2. Processors 230a and 230b as well as image generator 231, line-of-sight information transmitter 232, line-of-sight information receiver 233, line-of-sight information modifier 234, and image output unit 239 included in each of processor 230a and 230b represent the functions of the image generation process according to the present embodiment implemented by processor 202 shown in FIG. 2 reading and executing the image generation program in memory 204.

Image generator 231 of first subsystem 100a and image generator 231 of second subsystem 100b have a function identical to the function of image generator 231a of first subsystem 100a according to the second aspect. Line-of-sight information transmitter 232, line-of-sight information receiver 233, line-of-sight information modifier 234, and image output unit 239 of each of first subsystem 100a and second subsystem 100b have functions identical to the Functions of the respective units according to the first and second aspects, respectively.

That is, line-of-sight information transmitter 232 of second subsystem 100b transmits line-of-sight information of second user 101b to image generation device 200a of first subsystem 100a Over network 105. The line-of-sight information of second user 101b is received by line-of-sight information receiver 233 of first subsystem 100a. Image generator 231 of first subsystem 100a generates a virtual reality space image based on the received line-of-sight information of second user 101b. The generated virtual reality space image is output to HMD 120a of first subsystem 100a via image output unit 239 and displayed on display 122 of HMD 120a for presentation to first user 101a. Similarly, line-of-sight information transmitter 232 of first subsystem 100a transmits line-of-sight information of first user 101a to image generation device 200b of second subsystem 100b over network 105. The line-of-sight information of first user 101a is received by line-of-sight information receiver 233 of second subsystem 100b. Image generator 231 of second subsystem 100b generates virtual reality space image based on the received line-of-sight information of first user 101a. The generated virtual reality space image is output to HMD 120b of second subsystem 100b via image output unit 239 and displayed on display 122 of HMD 120b for presentation to second user 101b.

FIG. 8 conceptually shows virtual reality space images respectively generated by image generators 231 of first subsystem 100a and second subsystem 100b according to the third aspect. In FIG. 8, first user 101a and second user 101b are positioned in field 500 which is a partial region in a virtual reality space. An object 501 is also located in field 500. First user 101a and second user 101b are present on field 500 as players of a computer game (a sports game, an interactive fighting game, etc.), and are facing each other.

Image generator 231 of first subsystem 100a used by first user 101a generates a virtual reality space image 803a based on line-of-sight information of second user 101b transmitted from second subsystem 100b. Similarly to virtual reality space image 603a according to the second aspect, virtual reality space image 803a is an image taken from the viewpoint of first user 101a viewing the virtual reality space at the position of first user 101a in the virtual reality space. Virtual reality space image 803a includes an object representing second user 101b, as shown in FIG. 8. First user 101a may walk around in the virtual reality space, or may turn the line-of-sight direction, similarly to the second aspect. Image generator 231 of first subsystem 100a changes virtual reality space image 803a so as to follow such a movement of first user 101a. Furthermore, image generator 231 of first subsystem 100a controls object 101b in virtual reality space image 803a based on the line-of-sight information of second user 101b similarly to image generator 231a, according to the second aspect. For example, image generator 231 matches the orientation of object 101b in virtual reality space image 803a with the actual face orientation of second user 101b on field 500. Moreover, image generator 231 may locate object 101b at a position in virtual reality space image 803a that corresponds to the place where second user 101b stands on field 500.

Image generator 231 of second subsystem 100b used by second user 101b also generates a virtual reality space image 803b based on the line-of-sight information of first user 101a similarly to image generator 231 of first subsystem 100a. As shown in FIG. 8, virtual reality space image 803b is an image taken from the viewpoint of second user 101b viewing the virtual reality space at the position of second user 101b in the virtual reality space, and includes an object representing first user 101a. Furthermore, virtual reality space image 803b also includes object 501. Similarly to image generator 231 of first subsystem 100a, image generator 231 of second subsystem 100b changes virtual reality space image 803b so as to follow the movement of second user 101b, and controls the orientation and position of object 101a, in virtual reality space image 803b based on the line-of-sight information of first user 101a.

Line-of-sight information modifier 234 of each of first subsystem 100a and second subsystem 100b according to the present aspect modifies the line-of-sight information of second user 101b or first user 101a similarly to the cases in the above-described aspects. Each of subsystems 100a and 100b can smooth the movement of object 101b in virtual reality space image 803a and that of object 101a in virtual reality space image 803b by using the modified line-of-sight information.

In summary the embodiment disclosed in the present specification includes the following configurations.

(Configuration 1) According to an embodiment, image generation devices 200a and 200b for generating virtual reality space images are provided. Each of the image generation devices includes a memory 204 for storing an instruction, and a processor 202 coupled to memory 204 for executing the instruction. The instruction, when executed by processor 202, causes processor 202 to acquire, from a second terminal (HMD 120b) sharing a virtual reality space with a first terminal (e.g., HMD 120a) used by a first user, line-of-sight information including a position and a line-of-sight direction of a second user using the second terminal in the virtual reality space, generate a virtual reality space image to be displayed on the first terminal based on the line-of-sight information acquired from the second terminal, and supply the generated virtual reality space image to the first terminal.

(Configuration 2) The instruction further causes processor 202 to generate, as the virtual reality space image, a virtual reality space image identical to or similar to a virtual reality space image presented to the second user by the second terminal.

(Configuration 3) Generating the virtual reality space image includes generating, as the virtual reality space image, a virtual reality space image including an object located in a position and an orientation in accordance with the line-of-sight information in the virtual reality space.

(Configuration 4) The instruction further causes processor 202 to modify the line-of-sight information acquired from the second terminal to generate modified line-of-sight information. Generating the virtual reality space image includes generating a virtual reality space image based on the modified line-of-sight information.

(Configuration 5) Generating the modified line-of-sight information includes generating the modified line-of-sight information at a predetermined time interval.

(Configuration 6) Generating the modified line-of-sight information includes generating current modified line-of-sight information based on previous modified line-of-sight information and line-of-sight information previously acquired from the second terminal.

(Configuration 7) Generating the modified line-of-sight information includes performing linear interpolation on the previous modified line-of-sight information and the line-of-sight information previously acquired from the second terminal to generate the current modified line-of-sight information.

(Configuration 8) interpolation coefficients for the linear interpolation include a value in accordance with an angular difference between the line-of-sight direction included in the previous modified line-of-sight information and the line-of-sight direction included in the line-of-sight information previously acquired from the second terminal.

(Configuration 9) Among interpolation coefficients for the linear interpolation, an interpolation coefficient corresponding to a roll axis is set at a value different from interpolation coefficients corresponding to a pitch axis and a yaw axis such that a change of the virtual reality space image about the roll axis is smaller than changes about the pitch axis and the yaw axis.

(Configuration 10) According to another aspect of an embodiment, a computer-implemented method for generating a virtual reality space image is provided. This method includes acquiring, from a second terminal sharing a virtual reality space with a first terminal used by a first user, line-of-sight information including a position and a line-of-sight direction of a second user using the second terminal in the virtual reality space, generating a virtual reality space image to be displayed on the first terminal based on the line-of-sight information acquired from the second terminal, and supplying the generated virtual reality space image to the first terminal.

(Configuration 11) The method further includes generating, as the virtual reality space image, a virtual reality space image identical to or similar to a virtual reality space image presented to the second user by the second terminal.

(Configuration 12) Generating the virtual reality space image includes generating, as the virtual reality space image, a virtual reality space image including an object located in a position and an orientation in accordance with the line-of-sight information in the virtual reality space.

(Configuration 13) The method further includes modifying the line-of-sight information acquired from the second terminal to generate modified line-of-sight information. Generating the virtual reality space image includes generating a virtual reality space image based on the modified line-of-sight information.

(Configuration 14) Generating the modified line-of-sight information includes generating the modified line-of-sight information at a predetermined time interval.

(Configuration 15) Generating the modified line-of-sight information includes generating current modified line-of-sight information based on previous modified line-of-sight information and line-of-sight information previously acquired from the second terminal.

(Configuration 16) Generating the modified line-of-sight information includes performing linear interpolation on the previous modified line-of-sight information and the line-of-sight information previously acquired from the second terminal to generate the current modified line-of-sight information.

(Configuration 17) Interpolation coefficients for the linear interpolation include a value in accordance with an angular difference between the line-of-sight direction included in the previous modified line-of-sight information and the line-of-sight direction included in the line-of-sight information previously acquired from the second terminal.

(Configuration 18) Among interpolation coefficients for the linear interpolation, an interpolation coefficient corresponding to a roll axis is set at a value different from interpolation coefficients corresponding to a pitch axis and a yaw axis such that a change of the virtual reality space image about the roll axis is smaller than changes about the pitch axis and the yaw axis.

(Configuration 19) According to still another aspect of an embodiment, a non-transitory computer-readable recording medium storing an instruction causing a computer to execute a method for generating a virtual reality space image is provided. The method comprises acquiring, from a second terminal sharing a virtual reality space with a first terminal used by a first user, line-of-sight information including a position and a line-of-sight direction of a second user using the second terminal in the virtual reality space, generating a virtual reality space image to be displayed on the first terminal based on the line-of-sight information acquired from the second terminal, and supplying the generated virtual reality space image to the first terminal.

(Configuration 20) The method further comprises generating, as the virtual reality space image, a virtual reality space image identical to or similar to a virtual reality space image presented to the second user by the second terminal.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. An image generation device for generating a virtual reality space image, comprising:
    a memory for storing an instruction; and
    a processor coupled to the memory for executing the instruction, the instruction, when executed by the processor, causing the processor to:
        acquire, from a second terminal sharing a virtual reality space with a first terminal used by a first user, line-of-sight information including a position and a line-of-sight direction of a second user using the second terminal in the virtual reality space;
        generate a virtual reality space image to be displayed on the first terminal based on the line-of-sight information acquired from the second terminal; and
        automatically modify an image of the first terminal based on the generated virtual reality space image regardless of an input received from the first user, wherein the automatically modify the image of the first terminal comprises modifying the image of the first terminal at a slower interpolation speed than a modifying of an image of the second terminal.

2. The image generation device according to claim 1, wherein the instruction further causes the processor to generate, as the virtual reality space image, a virtual reality space image identical to or similar to a virtual reality space image presented to the second user by the second terminal.

3. The image generation device according to claim 1, wherein generating the virtual reality space image includes generating, as the virtual reality space image, a virtual reality space image including an object located in a position and an orientation in accordance with the line-of-sight information in the virtual reality space.

4. The image generation device according to claim 1, wherein
    the instruction further causes the processor to modify the line-of-sight information acquired from the second terminal to generate modified line-of-sight information, and
    generating the virtual reality space image includes generating a virtual reality space image based on the modified line-of-sight information.

5. The image generation device according to claim 4, wherein generating the modified line-of-sight information includes generating the modified line-of-sight information at a predetermined time interval.

6. The image generation device according to claim 5, wherein generating the modified line-of-sight information includes generating current modified line-of-sight information based on previous modified line-of-sight information and line-of-sight information previously acquired from the second terminal.

7. The image generation device according to claim 6, wherein generating the modified line-of-sight information includes performing linear interpolation on the previous modified line-of-sight information and the line-of-sight information previously acquired from the second terminal to generate the current modified line-of-sight information.

8. The image generation device according to claim 7, wherein interpolation coefficients for the linear interpolation include a value in accordance with an angular difference between the line-of-sight direction included in the previous modified line-of-sight information and the line-of-sight direction included in the line-of-sight information previously acquired from the second terminal.

9. The image generation device according to claim 7, wherein among interpolation coefficients for the linear interpolation, an interpolation coefficient corresponding to a roll axis is set at a value different from interpolation coefficients corresponding to a pitch axis and a yaw axis such that a change of the virtual reality space image about the roll axis is smaller than changes about the pitch axis and the yaw axis.

10. A computer-implemented method for generating a virtual reality space image, the method comprising:
   acquiring, from a second terminal sharing a virtual reality space with a first terminal used by a first user, line-of-sight information including a position and a line-of-sight direction of a second user using the second terminal in the virtual reality space; and
   controlling the first terminal to display a same field of view image as the second terminal based on the acquired line-of-sight information regardless of a input received from the first user, wherein the controlling the first terminal comprises changing the field of view image of the first terminal, based on a movement speed of the first user, at a slower interpolation speed than the field of view image of the second terminal.

11. The method according to claim 10, further comprising generating, as the virtual reality space image, a virtual reality space image identical to or similar to a virtual reality space image presented to the second user by the second terminal.

12. The method according to claim 10, wherein generating the virtual reality space image includes generating, as the virtual reality space image, a virtual reality space image including an object located in a position and an orientation in accordance with the line-of-sight information in the virtual reality space.

13. The method according to claim 10, further comprising modifying the line-of-sight information acquired from the second terminal to generate modified line-of-sight information, wherein
   generating the virtual reality space image includes generating a virtual reality space image based on the modified line-of-sight information.

14. The method according to claim 13, wherein generating the modified line-of-sight information includes generating the modified line-of-sight information at a predetermined time interval.

15. The method according to claim 14, wherein generating the modified line-of-sight information includes generating current modified line-of-sight information based on previous modified line-of-sight information and line-of-sight information previously acquired from the second terminal.

16. The method according to claim 15, wherein generating the modified line-of-sight information includes performing linear interpolation on the previous modified line-of-sight information and the line-of-sight information previously acquired from the second terminal to generate the current modified line-of-sight information.

17. The method according to claim 16, wherein interpolation coefficients for the linear interpolation include a value in accordance with an angular difference between the line-of-sight direction included in the previous modified line-of-sight information and the line-of-sight direction included in the line-of-sight information previously acquired from the second terminal.

18. The method according to claim 16, wherein among interpolation coefficients for the linear interpolation, an interpolation coefficient corresponding to a roll axis is set at a value different from interpolation coefficients corresponding to a pitch axis and a yaw axis such that a change of the virtual reality space image about the roll axis is smaller than changes about the pitch axis and the yaw axis.

19. A non-transitory computer-readable recording medium storing an instruction causing a computer to execute a method for generating a virtual reality space image, the method comprising:
   acquiring, from a second terminal sharing a virtual reality space with a first terminal used by a first user, line-of-sight information including a position and a line-of-sight direction of a second user using the second terminal in the virtual reality space;
   generating a virtual reality space image to be displayed on the first terminal based on the line-of-sight information acquired from the second terminal;
   supplying the generated virtual reality space image to the first terminal;
   controlling the first terminal to display a field of view image based on a field of view image of the second terminal, wherein the controlling the first terminal comprises changing the field of view image of the first terminal at a slower interpolation speed than the field of view image of the second terminal; and
   avoiding transmitting line-of-sight information of the first terminal to the second terminal.

20. The non-transitory computer-readable recording medium according to claim 19, wherein the method further comprises generating, as the virtual reality space image, a virtual reality space image identical to or similar to a virtual reality space image presented to the second user by the second terminal.

* * * * *